United States Patent
Kawai et al.

(10) Patent No.: US 8,300,131 B2
(45) Date of Patent: Oct. 30, 2012

(54) IMAGE PICKUP DEVICE FOR WIDE DYNAMIC RANGE AT A HIGH FRAME RATE

(75) Inventors: Tomoyuki Kawai, Saitama (JP); Yasunari Kato, Saitama (JP)

(73) Assignee: Fujifilm Corporation (JP)

( * ) Notice: Subject to any disclaimer, the term of this patent is extended or adjusted under 35 U.S.C. 154(b) by 120 days.

(21) Appl. No.: 12/980,647

(22) Filed: Dec. 29, 2010

(65) Prior Publication Data

US 2011/0096216 A1    Apr. 28, 2011

(30) Foreign Application Priority Data

Sep. 10, 2009   (JP) .................. 2009-209261

(51) Int. Cl.
*H04N 5/335* (2006.01)
*H04N 3/14* (2006.01)

(52) U.S. Cl. .................. 348/311; 348/302; 348/315

(58) Field of Classification Search ............. 348/315, 348/311, 302, 296–298
See application file for complete search history.

(56) References Cited

U.S. PATENT DOCUMENTS

| | | | | |
|---|---|---|---|---|
| 6,831,692 B1 * | 12/2004 | Oda | ................. | 348/315 |
| 7,733,403 B2 * | 6/2010 | Inoue | ................. | 348/311 |
| 2002/0080263 A1 * | 6/2002 | Krymski | ................. | 348/364 |
| 2004/0017497 A1 * | 1/2004 | Suzuki et al. | ................. | 348/315 |
| 2007/0211316 A1 * | 9/2007 | Chien | ................. | 358/527 |
| 2008/0199170 A1 * | 8/2008 | Shibuno et al. | ................. | 396/125 |
| 2010/0091159 A1 * | 4/2010 | Mabuchi | ................. | 348/300 |

FOREIGN PATENT DOCUMENTS

| | | |
|---|---|---|
| JP | 2003-032555 A | 1/2003 |
| JP | 2007-235656 A | 9/2007 |

* cited by examiner

*Primary Examiner* — Lin Ye
*Assistant Examiner* — Mekonnen Dagnew
(74) *Attorney, Agent, or Firm* — Studebaker & Brackett PC; Donald R. Studebaker (57) ABSTRACT

An image pickup device includes an image sensing device and a driving unit. The image sensing device includes a first pixel group and a second pixel group. The first pixel group includes a plurality of pixels arranged as a two-dimensional array in a semiconductor substrate surface portion that receives incidence light from a subject. The second pixel group includes a plurality of pixels arranged as a two-dimensional array in the semiconductor substrate surface portion in an area overlapping the first pixel group while the pixels in the first pixel group do not disposed in the same positions as the pixels in the second pixel group. The driving unit outputs a picked-up image signal of one frame from the first pixel group exposed over one vertical synchronizing time period for each vertical synchronizing signal.

20 Claims, 9 Drawing Sheets

IMAGE IN EXPOSURE TIME T1

FIG. 5B

IMAGE IN EXPOSURE TIME T2

IMAGE PICKUP DEVICE FOR WIDE DYNAMIC RANGE AT A HIGH FRAME RATE

CROSS-REFERENCE TO RELATED APPLICATIONS

This application is based upon and claims priority under 35 USC 119 from Japanese Patent Application No. 2009-209261, filed Sep. 10, 2009.

BACKGROUND

1. Technical Field

This invention relates to an image pickup device and an image pickup method for photographing an image in a wide dynamic range.

2. Related Art

A digital still camera installing a solid-state image sensing device such as a CCD-type image sensor or a CMOS-type image sensor involves a problem in that the dynamic range of a picked-up image is narrow because the saturation charge amount of each pixel is small.

Thus, technology development for widening the dynamic range of a picked-up image advances. For example, a related art described in JP-A-2007-235656, a large number of pixels installed in a solid-state image sensing device are separated into a first pixel group shaped like checkers or every other row and a second pixel group shaped like checkers or every other row, one pixel group is exposed for a long time, the other pixel group is exposed for a short time, signal charges detected by the pixel groups are added and combined, whereby the dynamic range of a picked-up image is widened.

However, the related art has a problem in that it is suited for widening the dynamic range of a still image, but is hard to widen the dynamic range of a moving image at a high frame rate.

A larger number of pixels of a recent solid-state image sensing device proceed and it is normal to install 1000000 pixels or more. In such a solid-state image sensing device, each pixel is made finer and thus the dynamic range further becomes narrow; this is a problem.

Further, for example, for the CCD type, it is necessary to provide a transfer path of signal charge in addition to a light reception part of each pixel (photoelectric conversion element) on a solid-state image sensing device chip and to widen the light reception part area as much as possible, the charge transfer passage becomes narrow. Thus, formerly, progressive (non-interlace) read of reading all at the same time the detected signal by each pixel of a solid-state image sensing device is normal. In recent years, multifield (interlace) read has become mainstream as in JP-A-2003-32555 and accordingly it takes time in reading a signal. This means that it takes time in reading a moving image at a high frame rate.

SUMMARY OF THE INVENTION

According to an aspect of the invention, an image pickup device includes an image sensing device and a driving unit. The image sensing device includes a first pixel group and a second pixel group. The first pixel group includes a plurality of pixels arranged as a two-dimensional array in a semiconductor substrate surface portion that receives incidence light from a subject. The second pixel group includes a plurality of pixels arranged as a two-dimensional array in the semiconductor substrate surface portion in an area overlapping the first pixel group while the pixels in the first pixel group do not disposed in the same positions as the pixels in the second pixel group. The driving unit outputs a picked-up image signal of one frame from the first pixel group exposed over one vertical synchronizing time period for each vertical synchronizing signal and that outputs a picked-up image signal of one frame from the second pixel group exposed over a plurality of vertical synchronizing time periods which is continuous and contains the one vertical synchronizing time period.

DETAILED DESCRIPTION

Figure 1:
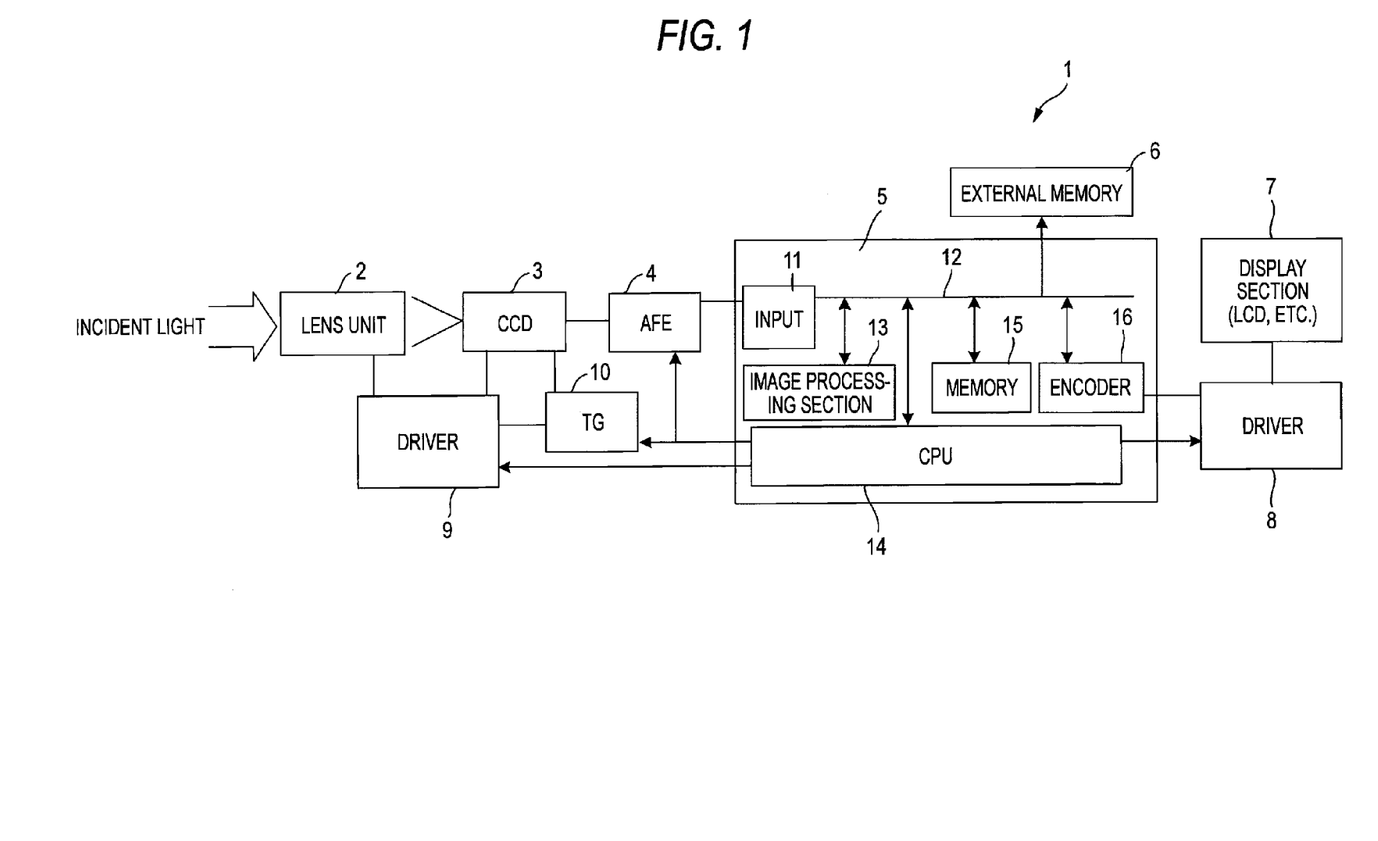
FIG. 1 is a function block diagram of an image pickup device according to one exemplary embodiment of the invention.

Exemplary embodiments of the invention will be discussed below with reference to the accompanying drawings:

FIG. 1 is a block diagram of an image pickup device with a moving image photographing function according to one exemplary embodiment of the invention. A image pickup device 1 includes a lens unit 2 for collecting incidence light from a subject, a solid-state image sensing device (in this example, CCD-type solid-state image sensing device) 3 for converting a subject optical image formed by the lens unit 2 into an electric signal and outputting the electric signal, an AFE (analog front end) circuit 4 for preprocessing (correlated double sampling processing, gain control, A/D conversion) of an analog picked-up image signal output from the solid-state image sensing device 3, an image processing circuit 5, an external memory 6, a display section 7 provided on the back, etc., of the image pickup device, a driver 8 of the display section 7, a driver 9 for driving the lens unit 2 and the solid-state image sensing device 3, and a timing generator (TG) 10 for outputting a timing signal to the driver 9 and the solid-state image sensing device 3 according to a command from the image processing circuit 5.

The image processing circuit 5 is implemented as one LSI and includes an input interface section 11 for inputting an output signal of the AFE circuit 4, a bus 12 connected to the input interface section 11, an image processing section (DSP) 13 connected to the bus 12, a central processing unit (CPU) 14, internal memory 15, and an encoder 16. The external memory 6 is connected to the bus 12. The encoder 16 is connected to the driver 8 and performs display control of a picked-up image displayed on the display section 7 according to a command from the CPU 14. The CPU 14 outputs a control signal to the AFE circuit 4, outputs a control signal to the TG 10, and also outputs a control signal to the driver 9.

Figure 2:
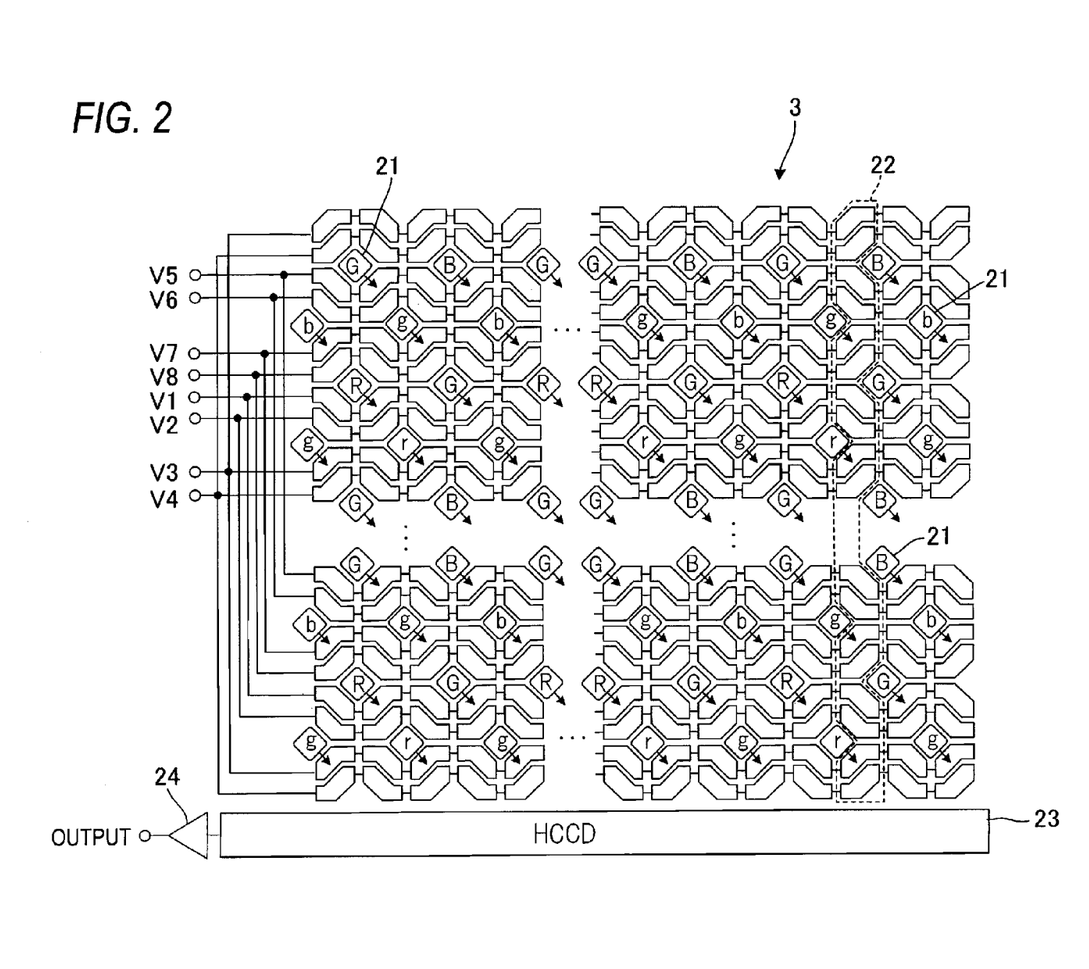
FIG. 2 is a surface schematic drawing of a CCD-type image sensor (image sensing device) shown in FIG. 1.

FIG. 2 is a surface schematic drawing of the solid-state image sensing device 3 shown in FIG. 1. The solid-state image sensing device 3 is honeycomb pixel arrangement and a plurality of pixels (photodiodes) 21 arranged and formed like a two-dimensional array on the surface of a semiconductor substrate are formed as even-numbered pixel rows shift half pixel pitches relative to odd-numbered pixels rows (the row direction is called the horizontal direction and the column direction orthogonal to the direction is called the vertical direction).

An embedded channel meandering in the vertical direction along each pixel column arranged in the vertical direction is formed and a transfer electrode film extending in the horizontal direction is laid through a gate insulating film on the semiconductor substrate surface, whereby a vertical charge transfer path (VCCD) 22 is formed along each pixel column. V1 to V8 denote vertical transfer electrodes where a read pulse and a vertical transfer pulse are applied for each row.

A horizontal charge transfer path (HCCD) 23 is formed along the transfer direction end part of each vertical charge transfer path 22, and an output amplifier 24 is provided in an output end part of the horizontal charge transfer path 23.

Figure 3:
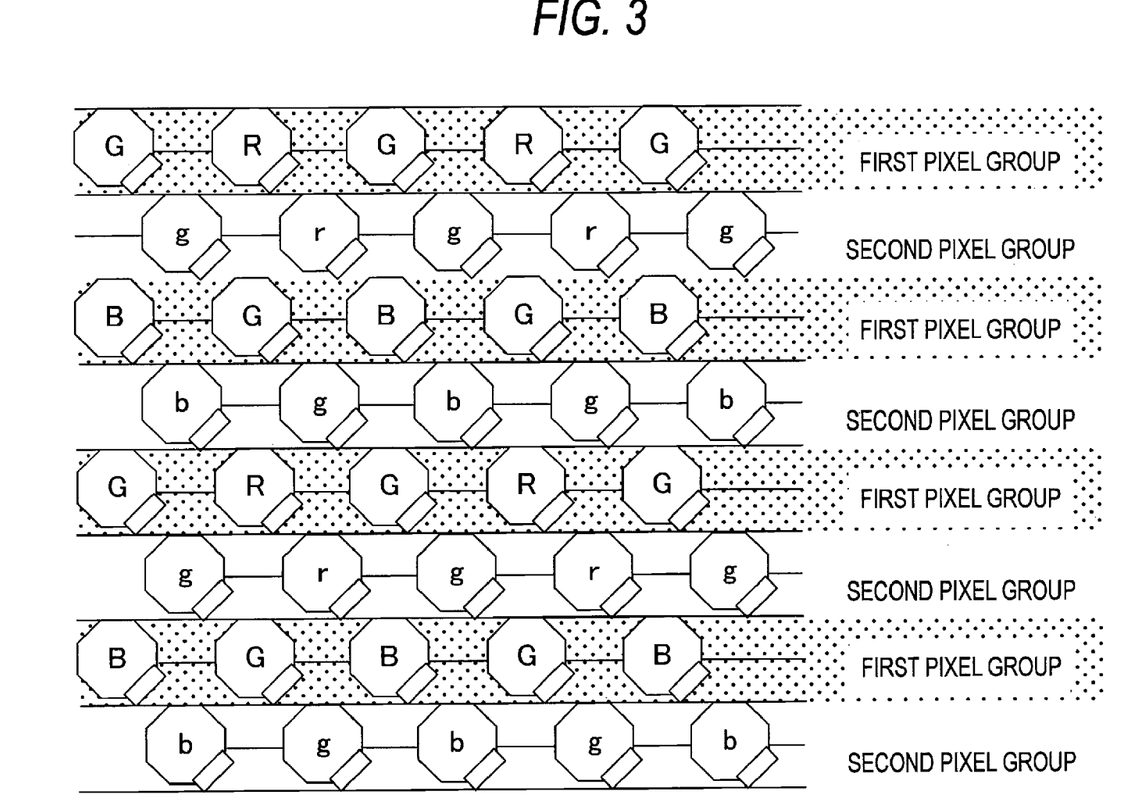
FIG. 3 is a schematic representation to separate the pixels of the image sensing device shown in FIG. 2 into a first pixel group and a second pixel group.

R, G, B, r, g, and b described on each pixel 21 in the figure represent colors of color filters; R and r represent "red," G and g represent "green," and B and b represent "blue." In the description to follow, a pixel row where uppercase letters R, G, and B are stacked every other row is "first pixel group" and a pixel row where lowercase letters r, g, and b are stacked every other row is "second pixel group," as shown in FIG. 3. The exemplary embodiment is designed so that the saturation charge amount of each pixel of the first pixel group and that of each pixel of the second pixel group are the same.

In the first pixel group where R, G, and B are stacked, a row of arrangement of GBGB . . . and a row of arrangement of RGRG . . . are arranged alternately and in the second pixel group where r, g, and b are stacked, a row of arrangement of gbgb . . . and a row of arrangement of rgrg . . . are also arranged alternately. Consequently, in the first pixel group and the second pixel group each consisting of the same number of pixels, the same colors R and r, G and g, and B and b are adjacent in the slanting direction.

Figure 4:
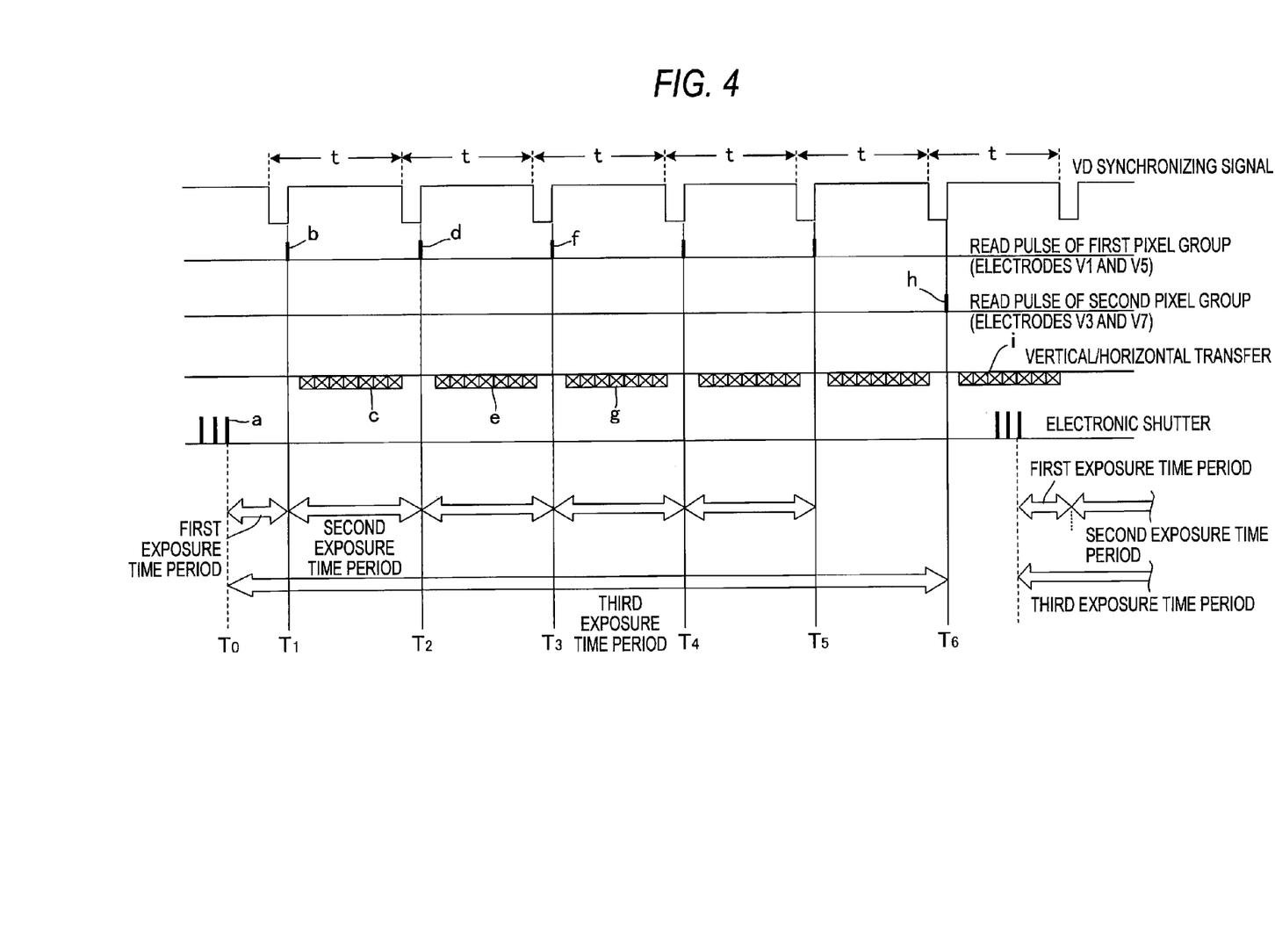
FIG. 4 is a timing chart to show an image pickup procedure of the image pickup device shown in FIG. 1.

FIG. 4 is a timing chart to show a read procedure of moving image data in a wide dynamic range at a high frame rate using the CCD-type image sensor shown in FIGS. 2 and 3.

As shown in FIG. 3, in the CCD-type image sensor used in the exemplary embodiment, seeing only the first pixel group, the pixels are arranged like a tetragonal lattice and R, G, and B color filters are bayer-arranged thereon and seeing only the second pixel group, the pixels are arranged like a tetragonal lattice and r, g, ad b color filters are bayer-arranged thereon.

That is, image data read from only the first pixel group (which will be hereinafter referred to as image data A) and image data read from the second pixel group (which will be hereinafter referred to as image data B) are roughly the same image data (image data shifting only one pixel at 45 degrees in the slanting direction) and the read electrodes (V1 and V5) in the first pixel group and the read electrodes (V3 and V7) in the second pixel group are different electrodes and thus separate read is possible.

Then, in the exemplary embodiment, as shown in FIG. 4, an electronic shutter (OFD pulse) a is applied to the semiconductor substrate of the CCD-type image sensor, stored charges (unnecessary charges) of the pixels of the first pixel group and the second pixel group are discharged to the semiconductor substrate side, and applying of the electronic shutter a is stopped at a predetermined timing T0. Accordingly, each pixel starts to store signal charge responsive to the light reception amount.

When a read pulse b is applied to the transfer electrodes V1 and V5 each also used as a read electrode in synchronization with a vertical synchronizing signal VD just after the predetermined timing T0, the stored charge of each pixel of the first pixel group is read to the vertical charge transfer path 22 at the applying time T1 of the read pulse b, and the signal charge stored in each pixel of the first pixel group in a first exposure time period of T0 to T1 is output from the image sensor 3 by vertical transfer drive/horizontal transfer drive c within the vertical synchronizing time period. No read pulse is applied to the second pixel group and thus storage of signal charge in each pixel of the second pixel group is continued from the time T0.

Although the signal charge is read from the first pixel group at the time T1, signal charge is stored in each pixel of the first pixel group again after the read pulse b is applied. When a read pulse d is applied to the read electrodes V1 and V5 in synchronization with the next vertical synchronizing signal VD, the stored charge of each pixel of the first pixel group is read to the vertical charge transfer path 22 at the applying time T2 of the read pulse d, and the signal charge stored in each pixel of the first pixel group in a second exposure time period of T1 to T2, namely, equal to the period of the vertical synchronizing signal VD is output from the image sensor 3 by vertical transfer drive/horizontal transfer drive e within the vertical synchronizing time period. No read pulse is applied to the second pixel group and thus storage of signal charge in each pixel of the second pixel group is continued from the time T0.

Although the signal charge is read from the first pixel group at the time T2, signal charge is stored in each pixel of the first pixel group again after the read pulse d is applied. When a read pulse f is applied to the read electrodes V1 and V5 in synchronization with the next vertical synchronizing signal VD, the stored charge of each pixel of the first pixel group is read to the vertical charge transfer path 22 at the applying time T3 of the read pulse f, and the signal charge stored in each pixel of the first pixel group in a second exposure time period of T2 to T3, namely, equal to the period of the vertical synchronizing signal VD is output from the image sensor 3 by vertical transfer drive/horizontal transfer drive g within the vertical synchronizing time period.

No read pulse is applied to the second pixel group and thus storage of signal charge in each pixel of the second pixel group is continued from the time T0. Thus, read/output of the signal charge in the second exposure time period is repeated any number of time periods, n.

After read/output of the signal charge in the second exposure time period is repeated the predetermined number of times n, a read pulse h is applied to the transfer electrodes V3 and V7 each also used as a read electrode at time T6 in the example in the figure in synchronization with the next vertical synchronizing signal VD. At this time, a read pulse is not applied to the read electrode V1 or V5.

Accordingly, the stored charge of each pixel of the second pixel group is read to the vertical charge transfer path 22, and the signal charge stored in each pixel of the second pixel group in a third exposure time period of T0 to T6 is output from the image sensor 3 by vertical transfer drive/horizontal transfer drive i within the vertical synchronizing time period.

Electronic shutter a is applied from any point in time within the vertical synchronizing time period applying the read pulse h and unnecessary charge of each pixel of the first pixel group and the second pixel group is discarded and when the next exposure start time is reached, applying the electronic shutter a is stopped and the above-described operation is repeated, whereby image data in three types of exposure times of short-time exposure (first exposure time period), medium-time exposure (second exposure time period), and long-time exposure (third exposure time period) may be obtained.

Thus, in the exemplary embodiment, the drive timing (drive pulse waveform) of the first pixel group and the drive timing (drive pulse waveform) of the second pixel group are made the same, the applying timing of the global electronic shutter applied to the semiconductor substrate is devised, and only the applying timing of the read pulse is changed in the first pixel group and the second pixel group, so that image data A1, A2, and B different in the exposure time may be obtained at a high frame rate and moreover in a state in which the frame rates are made uniform under easy control.

Letting the image data in the first exposure time period be A1, the image data in the second exposure time period be A2, and the image data in the third exposure time period be B, in the exemplary embodiment, a series of image data of . . . A1-A2-A2-A2-A2-B-A1-A2-A2-A2-A2-B-A1 . . . may be obtained. Of the image data A1, A2, and B, the image data A2 is obtained roughly each time in synchronization with the vertical synchronizing signal VD and thus each image data A2 is corrected and combined as appropriate using the image data A1 of short-time exposure and the image data B of long-time exposure with the image data A2 as the base of each frame image of a dynamic image, so that it is made possible to obtain a moving image in a wide dynamic range.

Figure 5A:
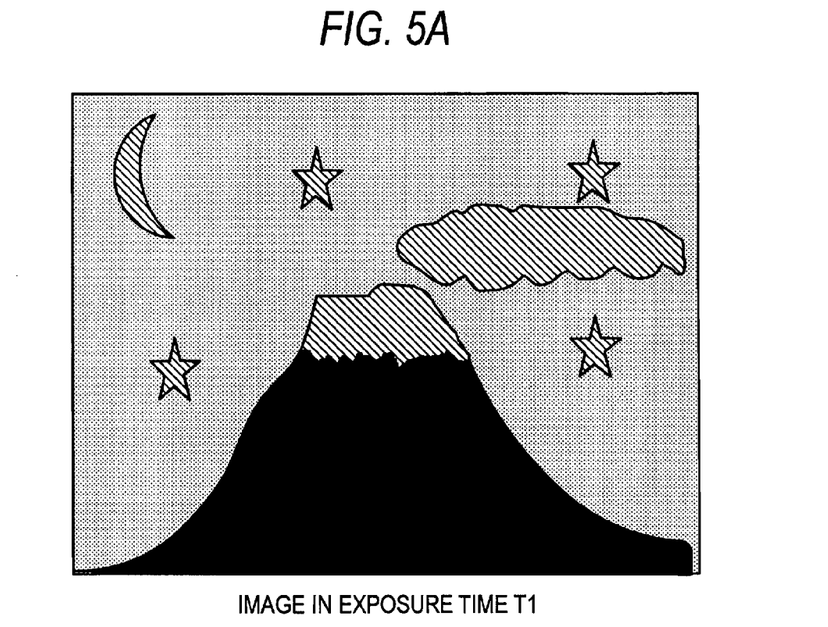
FIG. 5A is a drawing to illustrate an picked-up image in a first exposure time period shown in FIG. 4.
Figure 5B:
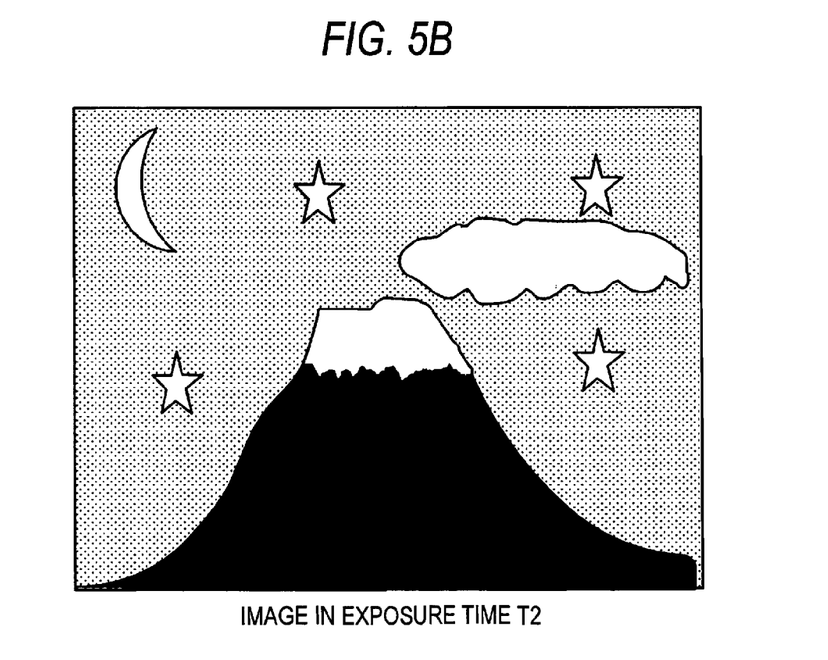
FIG. 5B is a drawing to illustrate an picked-up image in a third exposure time period shown in FIG. 4.

Alternatively, to display the moving image as a simpler moving image, the following may be adopted: FIG. 5(a) is a drawing to illustrate the image data A1 of short-time exposure and FIG. 5(b) is a drawing to illustrate the image data B of long-time exposure. The image data A1 is multiplied by the ratio between medium-time exposure and short-time exposure (gain) in the AFE circuit 4 in FIG. 1 and an image with sensitivity of equal degree to the image data A2 is used. The image data B is multiplied by the ratio between the long-time exposure and medium-time exposure in the AFE circuit 4 and an image with sensitivity of equal degree to the image data A2 is used as a basic image of each frame image of a dynamic image. After the reference image is created according to such a method, an image of a dark part is acquired from the image data B, the reference image is corrected, an image of a light part is acquired from the image data A1, the reference image is corrected, and the corrected reference image is continuously displayed in the sequence, whereby a moving image with small noise from the dark part to the light part is obtained.

In the description in FIG. 4, no read pulse is applied to the first pixel group at the read pulse h time of the second pixel group; however, a read pulse may also be applied to the first pixel group at the same time and the image data A2 may be output concurrently with output of the image data B and may be used.

A still image in a wide dynamic range may be created only with "A1-A2-A2-A2-A2-B" shown in FIG. 4, needless to say.

Further, in the description of the exemplary embodiment, an image in a wide dynamic range is obtained; for example, the above-described exemplary embodiment is applied to a monitoring camera, etc., a moving body moving at high speed may be detected with the image data A1 and A2 based on short-time exposure and medium-time exposure and a scarcely moving subject may be acquired with the image data B of long-time exposure.

Figure 6:
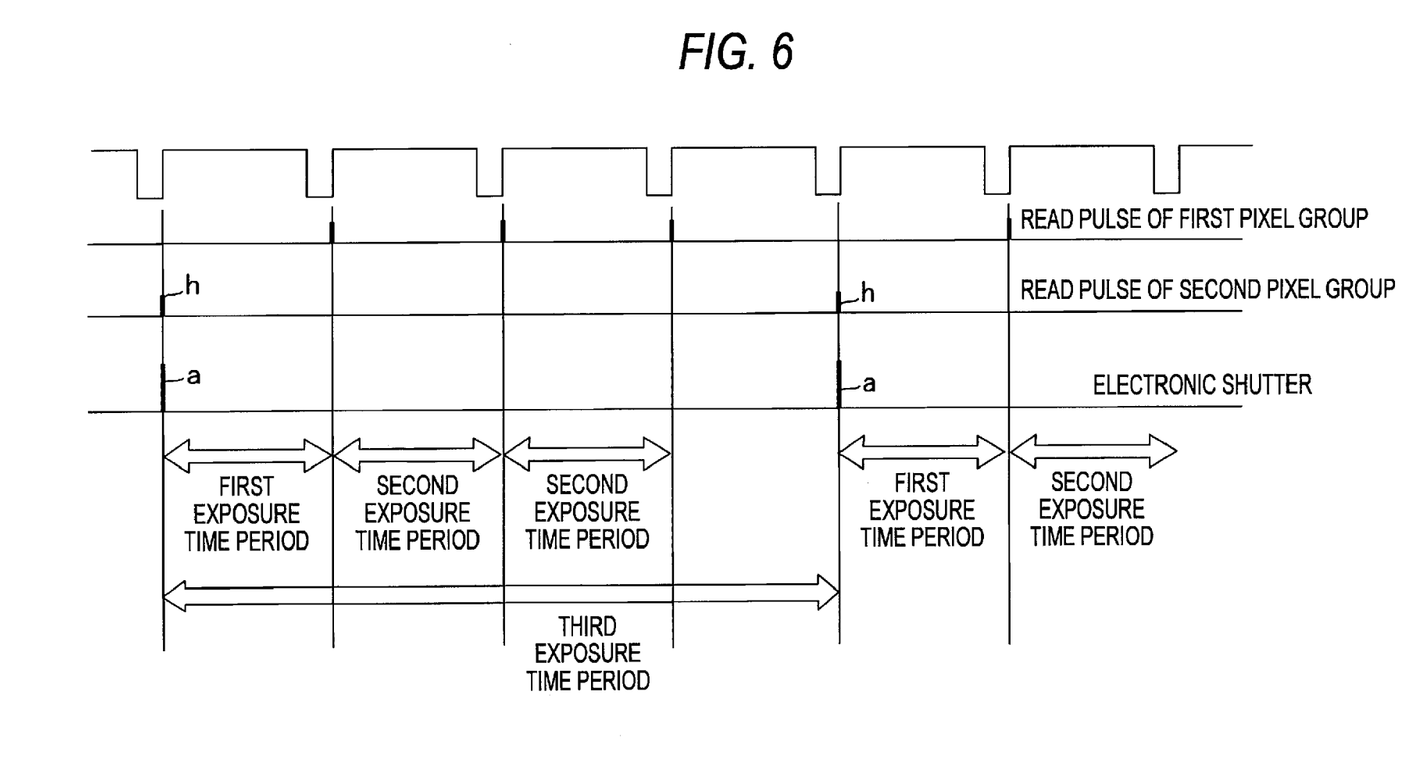
FIG. 6 is a timing chart to show an operation procedure of an exemplary embodiment in place of FIG. 4.

FIG. 6 is a time chart to show a modified example of the operation procedure described in FIG. 4. In the exemplary embodiment in FIG. 4, first exposure time period<second exposure time period (=vertical synchronizing time period; in the exemplary embodiment in FIG. 6, first exposure time period is nearly equal to second exposure time period.

That is, just after a read pulse h is applied to read electrodes V3 and V7 of the second pixel group to read signal charge from each pixel of the second pixel group to the vertical charge transfer path, an electronic shutter a is applied and unnecessary charge is discarded to the semiconductor substrate side. Accordingly, in the exemplary embodiment, image data A1 becomes nearly equal to image data A2 and thus image data of . . . A2-A2-A2-A2-B-A2-A2-A2-A2-B . . . may be obtained. That is, it is made possible to make the exposure time period of the image data B an integral multiple of the exposure time period of the image data A2.

Also in the exemplary embodiment, like the above-described exemplary embodiment, a read pulse may be applied to the first pixel group at the same time as a read pulse is applied to the second pixel group and read/transfer/output of the image data A2 may be performed concurrently with read/transfer/output of the image data B. In this case, unnecessary charge does not remain in each pixel of each pixel group and thus the electronic shutter becomes unnecessary, but the image data A1 of short-time exposure is not obtained.

Thus, of the first pixel group and the second pixel group making up one solid-state image sensing device 3, the image data A2 of the exposure time in one vertical synchronizing time period (one frame time period) for each vertical synchronizing signal is output from the first pixel group, and the image data B of the exposure time in n frame time period every n (n is an integer of two or more) vertical synchronizing signals, whereby it becomes easy to generate a moving image in a wide dynamic range.

In the exemplary embodiments described above, how many times the image data A2 is output in the time period until the image data B is output is arbitrary and the image pickup device may automatically determine it according to the exposure condition at the time.

Figure 7:
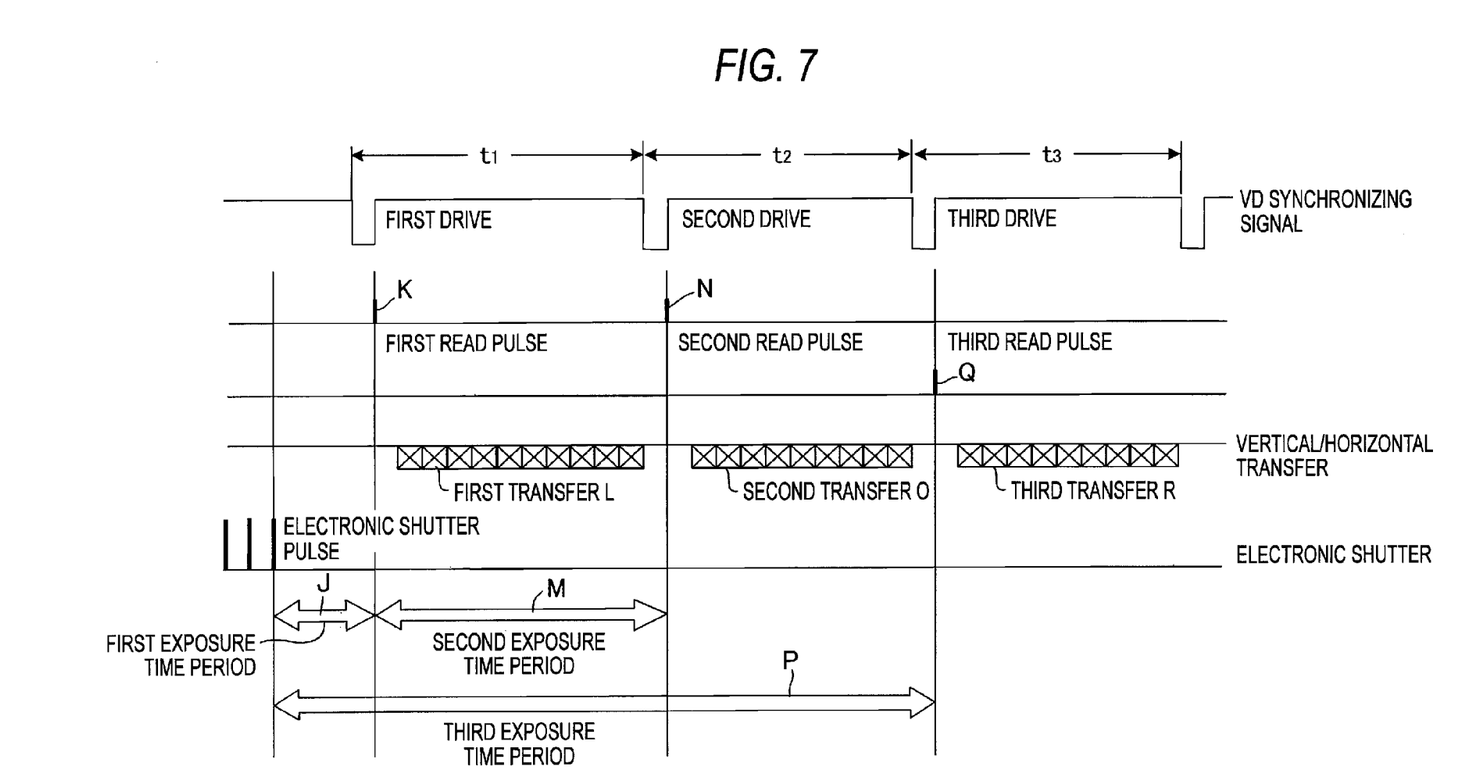
FIG. 7 is a timing chart to show an operation procedure of another exemplary embodiment in place of FIG. 4.

FIG. 7 is a timing chart to show an operation procedure according to another exemplary embodiment of the invention. The operation basically is the same as the operation described in FIG. 4. The operation of reading signal charge stored in the first pixel group in a first exposure time period J with a read pulse K, outputting in first transfer L, reading signal charge stored in the first pixel group in a second exposure time period M with a read pulse N, outputting in second transfer O, reading signal charge stored in the second pixel group in a third exposure time period P with a read pulse Q, and outputting in third transfer R is repeated.

In the exemplary embodiment, the third exposure time period is made about twice length of the second exposure time period. That is, in the exemplary embodiment shown in FIG. 4, the image data A2 is repeated two or more n times until the image data B is output, but in the exemplary embodiment in FIG. 7, the image data A2 is once output.

In the exemplary embodiment, it is also made possible to obtain a moving image in a wide dynamic range.

Each period t1, t2, and t3 of the vertical synchronizing signal VD applying the read pulses K, N, and Q may be t1=t2=t3 as the exemplary embodiment shown in FIG. 4; however, t1, t2, and t3 are set arbitrarily as t1≠t2≠t3, whereby it is made possible to more adjust the width of the dynamic range. Also in the embodiment, a still image in a wide dynamic range may be generated using the image data A1 of short-time exposure, the image data A2 of medium-time exposure, and the image data B of long-time exposure and is continuously output, whereby a moving image in a wide dynamic range may be generated.

The example using the CCD-type image sensor has been described. In the recent CCD-type image sensor, as described above, interlace read has become mainstream because the width of the vertical charge transfer path is narrow, it takes time in reading signal charge. In the drive method of the image sensing device of the exemplary embodiment, namely, the photographing method, when a moving image is photographed, image data is output separately in the first pixel group and the second pixel group and thus the method is suited for an image pickup device installing a CCD-type image sensor for performing interlace read, but the invention may also be applied to an image sensor for performing non-interlace read.

Figure 8:
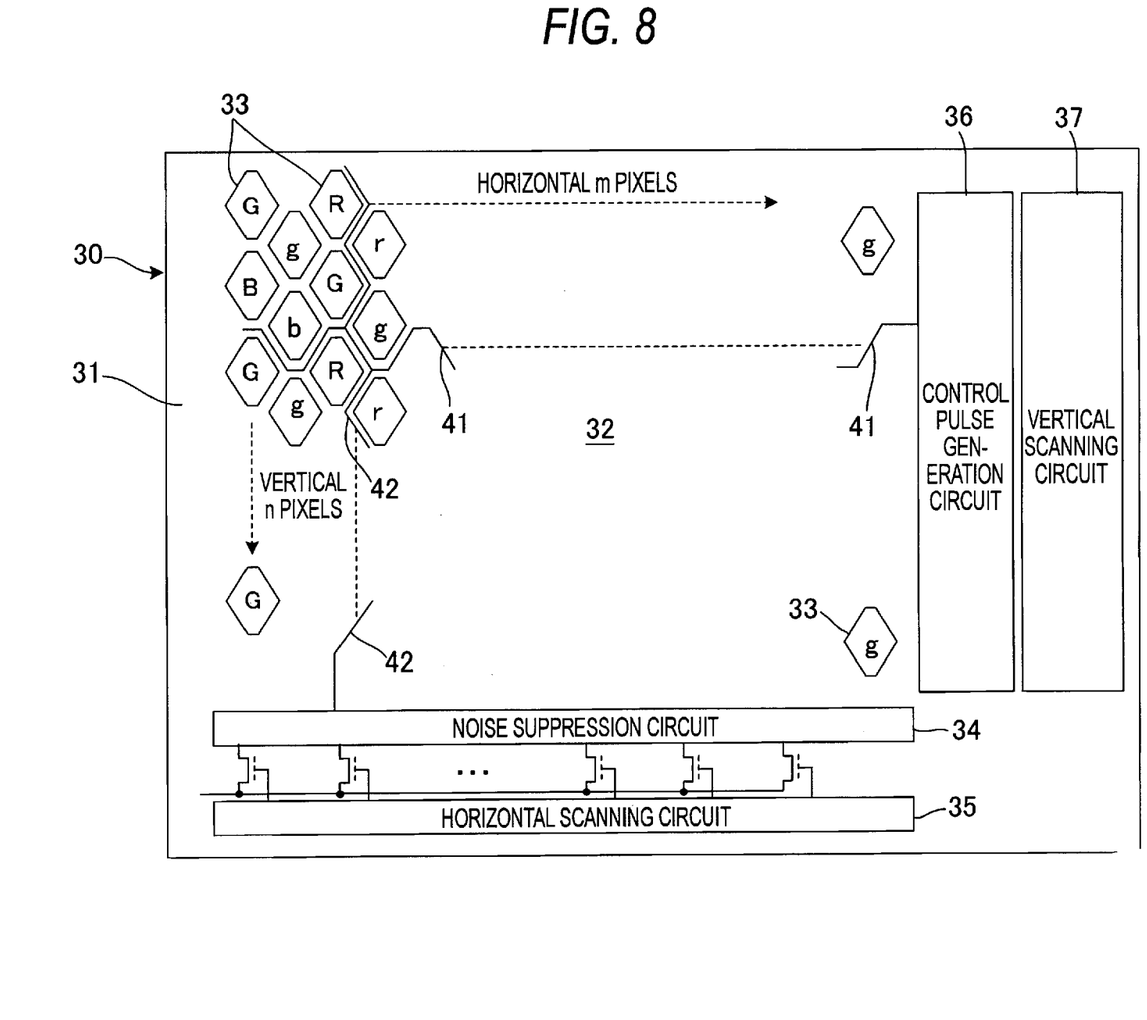
FIG. 8 is a surface schematic drawing of a CMOS-type image sensor in place of FIG. 2.

FIG. 8 is a surface schematic drawing of a CMOS-type image sensor to which another exemplary embodiment of the invention is applied. A CMOS-type image sensor 30 shown in the figure is formed with a large number of pixels 33 like a two-dimensional array on a light reception face 32 of a semiconductor substrate 31 and even-numbered pixel rows 33 shift half pixel pitches relative to odd-numbered pixels rows 33; honeycomb pixel arrangement is formed.

In the CMOS-type image sensor 30 of the exemplary embodiment, like the CCD-type image sensor in FIGS. 2 and 3, pixels on every other row make up a first pixel group and remaining pixels on every other row make up a second pixel group. That is, the CMOS-type image sensor 30 includes the first pixel group made up of a plurality of pixels arranged and formed like a two-dimensional array on a semiconductor substrate surface portion for receiving incidence light from a subject and the second pixel group made up of a plurality of pixels arranged and formed like a two-dimensional array in an area overlapping the first pixel group and having the pixels at shift positions relative to the pixels of the first pixel group.

A noise suppression circuit 34 and a horizontal scanning circuit 35 are provided in a lower side portion of a semiconductor substrate 31 and a control pulse generation circuit 36 and a vertical scanning circuit 37 are provided in a right side portion of the semiconductor substrate 31. They operate upon reception of control pulses from the CPU 14 and the timing generator 10 in FIG. 1.

Each pixel 33 is made up of a photodiode and a signal read circuit not shown in the figure 3-transistor configuration and 4-transistor configuration are known (for example, refer to Japanese Patent Laid-Open No. 2007-81139 and Japanese Patent Laid-Open No. 2007-81140)) for reading a signal detected by the photodiode, and color filters R, G, and B are stacked on the photodiodes.

In the exemplary embodiment, arrangement of the color filters is the same as that in FIG. 2, FIG. 3; the color filters on the first pixel group are indicated by uppercase letters RGB and the color filters on the second pixel group are indicated by lowercase letters rgb.

In the exemplary embodiment, since the pixels 33 are in honeycomb arrangement, wiring 41 (reset line, row selection line; only one line is shown in FIG. 8) in the horizontal direction (X direction) connected for each pixel row to the control pulse generation circuit 36 and the vertical scanning circuit 37 is provided in a meandering manner in the horizontal direction so as to avoid the photodiodes on the light reception face 32. Likewise, wiring 42 (power supply line, output signal line; only one line is shown in FIG. 8) in the vertical direction (Y direction) connected for each pixel column to the noise suppression circuit 34 and the horizontal scanning circuit 35 is also provided in a meandering manner in the vertical direction.

To pick up a subject image and output a detection signal by the CMOS-type image sensor 30, unlike the CCD-type image sensor, a detection signal is taken out from each pixel specified by XY by X scanning (vertical scanning) and Y scanning (horizontal scanning). Generally, a subject image is output from the image sensor 30 by operation of a rolling shutter.

The rolling shutter is the operation of first outputting a detection signal of the first pixel row, next outputting a detection signal of the second pixel row, . . . , outputting a detection signal of the (n−1)st pixel row, and outputting a detection signal of the nth pixel row in one frame time period (one vertical synchronizing time period).

In the exemplary embodiment, the image data A of short-time exposure is output from the first pixel group and the image data B of long-time exposure is output from the second pixel group based on the rolling shutter operation.

Figure 9:
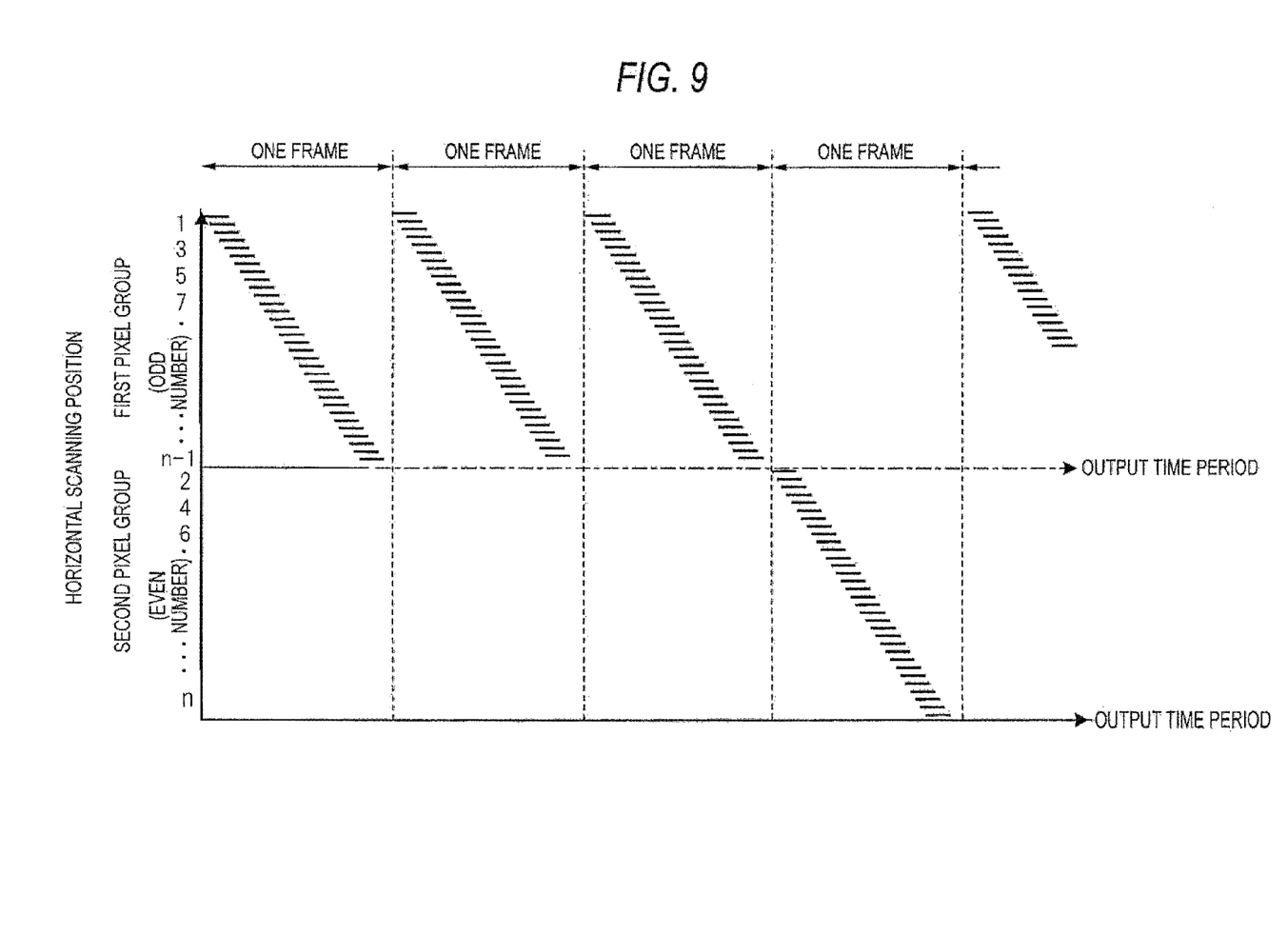
FIG. 9 is a schematic representation of an image pickup procedure of the CMOS-type image sensor shown in FIG. 8.

FIG. 9 is a drawing to describe the read timing of a picked-up image signal from the CMOS-type image sensor in FIG. 8. The first pixel group and the second pixel group making up the CMOS-type image sensor in FIG. 8 differ in pixel row and thus a reset signal and a signal read signal (a row selection signal for three transistors or a row read signal for four transistors) may be applied at different timings for each pixel row. Each pixel of each pixel row repeats the operation of starting exposure when a reset signal is applied, terminating exposure when a signal read signal is applied, and again starting exposure when a reset signal is applied.

Then, in the example shown in the figure, first the detection signal of each pixel row of odd-numbered rows of a first row, a third row, and a fifth row, . . . (namely, first pixel group) is output in order for obtaining picked-up image data of a first frame, next again the detection signal of each pixel row of odd-numbered rows of a first row, a third row, and a fifth row, . . . (first pixel group) is output in order for obtaining picked-up image data of a second frame, again the detection signal of each pixel row of odd-numbered rows of a first row, a third row, and a fifth row, . . . (first pixel group) is output in order for obtaining picked-up image data of a third frame and then the detection signal of each pixel row of even-numbered rows of a second row, a fourth row, a sixth row, . . . (second pixel group) is output in order for obtaining picked-up image data of a fourth frame.

When the image of the first frame (picked-up image based on the first pixel group) is obtained, if a reset signal is applied to each pixel row of the second pixel group and exposure is started at the same timing as the timing of applying a reset signal to each pixel row of the first pixel group, the picked-up image of the fourth frame, namely, the picked-up image based on the second pixel group becomes an image with the exposure time three times that of each image of the first frame, the second frame, and the third frame. If the operation is repeated, a moving image of A-A-A-B-A-A-A-B-A may be obtained and it is made possible to provide a wider dynamic range of the picked-up image from the image data A and the image data B.

The exemplary embodiment corresponds to the exemplary embodiment in FIG. 6 as for the CCD type, how many times the long exposure time is longer than the short exposure time may be determined according to the exposure condition of the subject, etc., at the time; any may be set like AABAAB . . . , AAAABAAAAB . . . , etc.

Thus, in the embodiment, like the above-described embodiments, a difference is provided in a unit of a vertical synchronizing time period (one frame time period) between the exposure time of the first pixel group and the exposure time of the second pixel group by a drive timing signal from the CPU 14 and the TG 10 in FIG. 1 forming image sensing device drive means and the image data of short-time exposure and the image data of lone-time exposure photographed at the same time are obtained at the same time, so that it is made possible to easily obtain a still image and a moving image in a wide dynamic range.

In the embodiment, one frame time period t of short-time exposure is set to t1≠t2≠t3 as described in FIG. 7, whereby it is made possible to set short-time exposure, medium-time exposure, and lone-time exposure as desired.

In the above-described embodiments, the solid-state image sensing device (image sensor) installing color filters is taken as an example, but the above-described embodiments may also be applied to an image sensor for monochrome image pickup installing no color filters as they are.

In the description, the image sensor wherein the whole pixel arrangement is honeycomb pixel arrangement, color filters of bayer arrangement are stacked in the first pixel group, and color filters of bayer arrangement are also stacked in the second pixel group is taken as an example, but pixel arrangement and color filter arrangement are not limited to the above-described embodiments. For example, as described in FIG. 1(a) in Patent Document 1 (Japanese Patent Laid-Open No. 2007-235656), the pixel group arranged like a tetragonal lattice as a whole may be separated into a first pixel group on every other row and a second pixel group on every other row or may be separated into a first pixel group on every other column and a second pixel group on every other column. To install color filters, the color filter arrangements of the first pixel group and the second pixel group are the same.

As described above, the image pickup device and the image pickup method of the exemplary embodiments are characterized by the fact that in the image pickup device installing an image sensing device including a first pixel group made up of a plurality of pixels arranged and formed like a two-dimensional array in a semiconductor substrate surface portion for receiving incidence light from a subject and a second pixel group made up of a plurality of pixels arranged and formed like a two-dimensional array in the semiconductor substrate surface portion in an area overlapping the first pixel group and having the pixels at shift positions relative to the pixels of the first pixel group, a picked-up image signal of one frame is output from the first pixel group exposed over one vertical synchronizing time period for each vertical synchronizing signal and a picked-up image signal of one frame is output from the second pixel group exposed over a plurality of vertical synchronizing time periods continuous containing the one vertical synchronizing time period.

The image pickup device and the image pickup method of the exemplary embodiments are characterized by the fact that in the image pickup device installing an image sensing device including a first pixel group made up of a plurality of pixels arranged and formed like a two-dimensional array in a semiconductor substrate surface portion for receiving incidence light from a subject and a second pixel group made up of a plurality of pixels arranged and formed like a two-dimensional array in the semiconductor substrate surface portion in an area overlapping the first pixel group and having the pixels at shift positions relative to the pixels of the first pixel group, the image sensing device is driven in synchronization with a vertical synchronizing signal, a difference is provided in a unit of a vertical synchronizing time period of the vertical synchronizing signal between the exposure time of the first pixel group and the exposure time of the second pixel group, and a picked-up image signal is output each from the first pixel group and the second pixel group.

The image pickup device and the image pickup method of the exemplary embodiments are characterized by the fact that the first pixel group and the second pixel group are driven at the same drive timing and differ only in the drive timing for determining the exposure start and the drive timing for determining the exposure termination.

The image pickup device and the image pickup method of the exemplary embodiments are characterized by the fact that when the picked-up image signal of one frame is output from the second pixel group, output of the picked-up image signal from the first pixel group is stopped.

The image pickup device and the image pickup method of the exemplary embodiments are characterized by the fact that a picked-up image signal of a plurality of frames is continuously output from the first pixel group and then the picked-up image signal of one frame is output.

The image pickup device and the image pickup method of the exemplary embodiments are characterized by the fact that when a picked-up image signal of at least two frames is continuously output from the first pixel group, the exposure time of the picked-up image signal of the first one frame is made shorter than the exposure time of the picked-up image signal of the later one frame.

The image pickup device and the image pickup method of the exemplary embodiments are characterized by the fact that each vertical synchronizing time period for each vertical synchronizing signal is the same.

The image pickup device and the image pickup method of the exemplary embodiments are characterized by the fact that each vertical synchronizing time period for each vertical synchronizing signal differs.

The image pickup device and the image pickup method of the exemplary embodiments are characterized by the fact that the operation from output of the picked-up image signal from the first pixel group to output of the picked-up image signal from the second pixel group is repeated.

The image pickup device and the image pickup method of the exemplary embodiments are characterized by the fact that when exposure of the first pixel group starts, an electronic shutter pulse is applied to a semiconductor substrate, whereby the exposure time of the first pixel group is shortened and the electronic shutter pulse applying time is the exposure start of the second pixel group.

The image pickup device and the image pickup method of the exemplary embodiments are characterized by the fact that the picked-up image signal is multiplied by the gain of the exposure time ratio between the first pixel group and the second pixel group and the result is output.

The image pickup device and the image pickup method of the exemplary embodiments are characterized by the fact that color filters of the same arrangement are stacked on the first pixel group and the second pixel group.

According to the exemplary embodiments described above, image data exposed for a short time for each frame time period is output from the first pixel group and image data exposed for a long time over a plurality of frame time periods containing the same exposure time period as the first pixel group is output from the second pixel group, so that it is made possible to widen the dynamic range of not only a still image, but also a moving image.

INDUSTRIAL APPLICABILITY

The image pickup device according to the invention uses an existing system configuration and may photograph an image in a wide dynamic range regardless of a still image or a moving image simply by changing the drive timing of the image sensing device and thus useful for application to a digital still camera, a digital video camera, a mobile telephone with a camera, an electronic device with a camera, a monitoring camera, etc.

As described reference to the exemplary embodiment, there is provided image data by short-time exposure and image data by long-time exposure photographed at the same time as that image data is obtained. Accordingly, it is possible to generate an image in a wide dynamic range.

What is claimed is:

1. An image pickup device comprising: an image sensing device that includes:
    a first pixel group including a plurality of pixels arranged as a two-dimensional array in a semiconductor substrate surface portion that receives incidence light from a subject; and a second pixel group including a plurality of pixels arranged as a two-dimensional array in the semiconductor substrate surface portion in an area overlapping the first pixel group while the pixels in the first pixel group are not disposed in the same positions as the pixels in the second pixel group; and
        a driving unit that outputs a picked-up image signal of one frame from the first pixel group exposed over one vertical synchronizing time period for each vertical synchronizing signal and that outputs a picked-up image signal of one frame from the second pixel group exposed over a plurality of vertical synchronizing time periods which is continuous and contains the one vertical synchronizing time period.

2. The image pickup device according to claim 1, wherein the first pixel group and the second pixel group are driven according to the same drive timing but the first pixel group and the second pixel group are not driven according to the same drive timing when the exposure start is determined and the exposure termination is determined.

3. The image pickup device according to claim 1, wherein when the picked-up image signal of one frame is output from the second pixel group, output of the picked-up image signal from the first pixel group is stopped.

4. The image pickup device as claimed in claim 3 wherein a picked-up image signal of a plurality of frames is continuously output from the first pixel group and then the picked-up image signal of one frame is output.

5. The image pickup device according to claim 1, wherein when a picked-up image signal of at least two frames is continuously output from the first pixel group, the exposure time of the picked-up image signal of a first one frame of the at least two frames is made shorter than the exposure time of the picked-up image signal of a later one frame which is subsequent to the first one frame.

6. The image pickup device according to claim 5, wherein when exposure of the first pixel group starts, an electronic shutter pulse is applied to a semiconductor substrate so that the exposure time of the first pixel group is shortened and the exposure of the second pixel group is started when the electronic shutter pulse is applied.

7. The image pickup device according to claim 1, wherein each vertical synchronizing time period for each vertical synchronizing signal is the same.

8. The image pickup device according to claim 1, wherein each vertical synchronizing time period for each vertical synchronizing signal differs.

9. The image pickup device according to claim 1, wherein operations from output of the picked-up image signal from the first pixel group to output of the picked-up image signal from the second pixel group is repeated.

10. The image pickup device according to claim 1, wherein the picked-up image signal output from the first pixel group is set by using a gain that is determined based on the exposure time ratio between the first pixel group and the second pixel group.

11. The image pickup device according to claim 1, wherein color filters having the same arrangement are stacked on the first pixel group and the second pixel group.

12. An image pickup device comprising: an image sensing device that includes:
    a first pixel group including a plurality of pixels arranged as a two-dimensional array in a semiconductor substrate surface portion that receives incidence light from a subject; and a second pixel group including a plurality of pixels arranged as a two-dimensional array in the semiconductor substrate surface portion in an area overlapping the first pixel group while the pixels in the first pixel group are not disposed in the same position as the pixels in the second pixel group; and
        a driving unit that drives the image sensing device in synchronization with a vertical synchronizing signal so as to provide timing difference between the exposure time of the first pixel group and the exposure time of the second pixel group by a unit of a vertical synchronizing time period of the vertical synchronizing signal and that lets the first pixel group and the second pixel group output a picked-up image signal.

13. The image pickup device according to claim 12, wherein the first pixel group and the second pixel group are driven according to the same drive timing but the first pixel group and the second pixel group are not driven according to the same drive timing when the exposure start is determined and the exposure termination is determined.

14. The image pickup device according to claim 12, wherein when the picked-up image signal of one frame is output from the second pixel group, output of the picked-up image signal from the first pixel group is stopped.

15. The image pickup device according to claim 12, wherein when a picked-up image signal of at least two frames is continuously output from the first pixel group, the exposure time of the picked-up image signal of a first one frame of the at least two frames is made shorter than the exposure time of the picked-up image signal of a later one frame which is subsequent to the first one frame.

16. The image pickup device according to claim 12, wherein each vertical synchronizing time period for each vertical synchronizing signal is the same.

17. The image pickup device according to claim 12, wherein each vertical synchronizing time period for each vertical synchronizing signal differs.

18. The image pickup device according to claim 12, wherein operations from output of the picked-up image signal from the first pixel group to output of the picked-up image signal from the second pixel group is repeated.

19. The image pickup device according to claim 12, wherein the picked-up image signal output from the first pixel group is set by using a gain that is determined based on the exposure time ratio between the first pixel group and the second pixel group.

20. The image pickup device according to claim 12, wherein color filters having the same arrangement are stacked on the first pixel group and the second pixel group.

* * * * *